Jan. 24, 1939.  A. W. NELSON  2,144,661

BAIL ATTACHING MEANS

Filed May 18, 1936

Inventor:
Andrew W. Nelson
By Jabel, Carlson & Wells
Attorney

Patented Jan. 24, 1939

2,144,661

UNITED STATES PATENT OFFICE 2,144,661

BAIL ATTACHING MEANS

Andrew W. Nelson, Terre Haute, Ind., assignor to Columbian Enameling & Stamping Co., Inc., Terre Haute, Ind., a corporation of Indiana Application May 18, 1936, Serial No. 80,379

2 Claims. (Cl. 220—91)

This invention relates to a means for attaching bails to kettles and the like and is particularly directed toward a novel ear construction for mounting upon kettles to receive a bail.

It is the principal purpose of this invention to provide a bail attaching means which is capable of holding the bail in elevated position when used with a spring bail and which is constructed to receive enamel coating in such a way as to provide all smooth edges wherever the edges are exposed and thereby to prevent damage to the enamel.

It is a further purpose of this invention to provide a novel ear construction of this character which permits the complete coating of the ear structure after it is secured to the vessel.

Other and more specific objects and advantages of the invention will appear as the description proceeds in connection with the accompanying drawing. It is to be understood, however, that the drawing and description are illustrative only and are not to be taken as limiting the invention except in so far as it is limited by the claims.

In the drawing—

Figure 1:
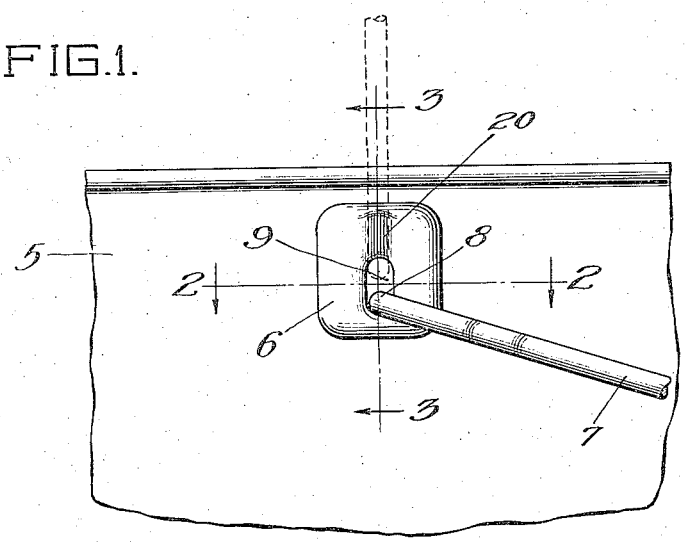
Fig. 1 is a fragmentary view in side elevation of a kettle to which the novel bail attaching means has been applied.

Referring now in detail to the drawing, the numeral 5 indicates a portion of a vessel such as a kettle. The numeral 6 indicates a bail attaching ear which is secured to a kettle in a manner which will be hereinafter described, and the numeral 7 indicates a bail which is provided with a hooked end 8 adapted to enter an aperture 9 in the ear 6.

It will be noted that the kettle 5 and the ear 6 are coated inside and outside with enamel. The outside layer of enamel is indicated by the numeral 10, and the inside layer is indicated by the numeral 11. The ear 6 is formed of sheet metal like the vessel 5, and has a substantially rectangular shape although this is not essential. The ear 6 is formed from a piece of sheet metal so as to provide a body or outer portion 12 and a flange or rim portion 13 which extends toward the vessel 5.

The rim portion 13 abuts directly against the sheet metal of the vessel 5 and is butt welded thereto throughout its extent wherever it contacts the vessel 5. Thus no sharp edges are left around the rim 13 where it contacts the vessel 5. The result is that the enamel coating 10 runs into the corners between the rim 13 and the vessel 5 and forms fillets as indicated at 14 and 15 in Fig. 2. The rim 13 is cut out at 16 at the top of the ear and at 17 at the bottom of the ear to provide the top and bottom opening for free ingress and egress of enamel and air in the coating with enamel so that the interior surface of the ear 6 may be coated just as readily as the exterior.

Figure 2:
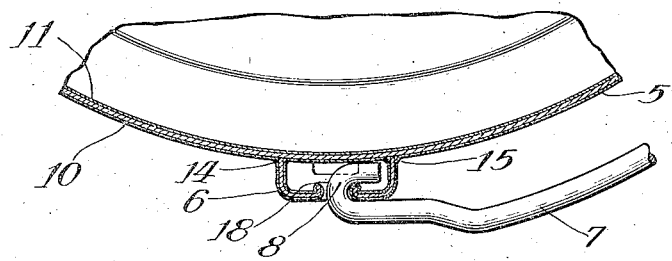
Fig. 2 is a sectional view on the line 2—2 of Fig. 1.
Figure 3:
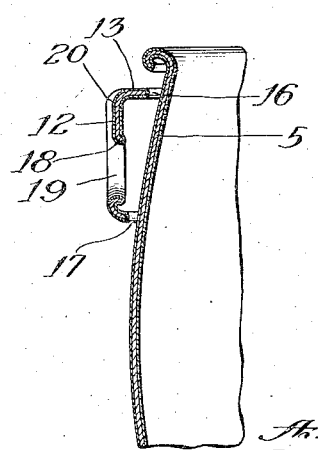
Fig. 3 is a sectional view on the line 3—3 of Fig. 1.

Around the opening 9, the wall 12 of the ear is curled inwardly as shown at 18 in Figs. 2 and 3. The reason for this curled edge is to provide a rounded surface at 19 around the opening 9 upon which the hooked portion 8 of the bail 7 may ride. This surface provides a sufficient bearing for the bail to prevent any damage to the enamel.

The wall 12 of the ear is further provided with a depression 20 running vertically from the opening 9 to the top of the ear 6. The purpose of this depression is to provide a place wherein the bail 7, which is preferably of spring wire and held under tension in its application to the kettle 5, can seat itself and remain in an upright position as indicated in Fig. 1.

From the above description, it is believed that the construction and advantages of this device will be readily apparent to those skilled in this art.

Having thus described my invention, what I claim as new and desire to secure by Letters Patent is:

1. In combination, a sheet metal vessel, a sheet metal bail ear having a rim butt welded directly to the vessel, said rim being recessed to provide openings between the vessel and the ear whereby the surfaces within the ear may be enameled after its attachment to the vessel, said ear having a bail receiving opening therein, the outer wall of said ear having a depression therein extending upwardly from the bail receiving opening to the top of said ear.

2. In combination, a sheet metal vessel, a sheet metal cup-shaped bail ear having a rim butt welded directly to the vessel, said rim being provided with small oppositely disposed recesses providing openings between the vessel and the cup-shaped ear whereby the interior surfaces of the ear may be enameled after its attachment to the vessel, said ear having a bail receiving opening in its outer wall, the metal around said bail receiving opening being curved inwardly and providing a smooth convex surface for receiving enamel upon which the bail will bear, said opening being close to the lower rim of the bail ear, and the outer wall of said bail ear being pressed inward from the top of the opening to the top of the ear.

ANDREW W. NELSON.